March 22, 1927.
H. ANLAUF ET AL
1,622,216
COUPLING
Filed Nov. 4, 1925
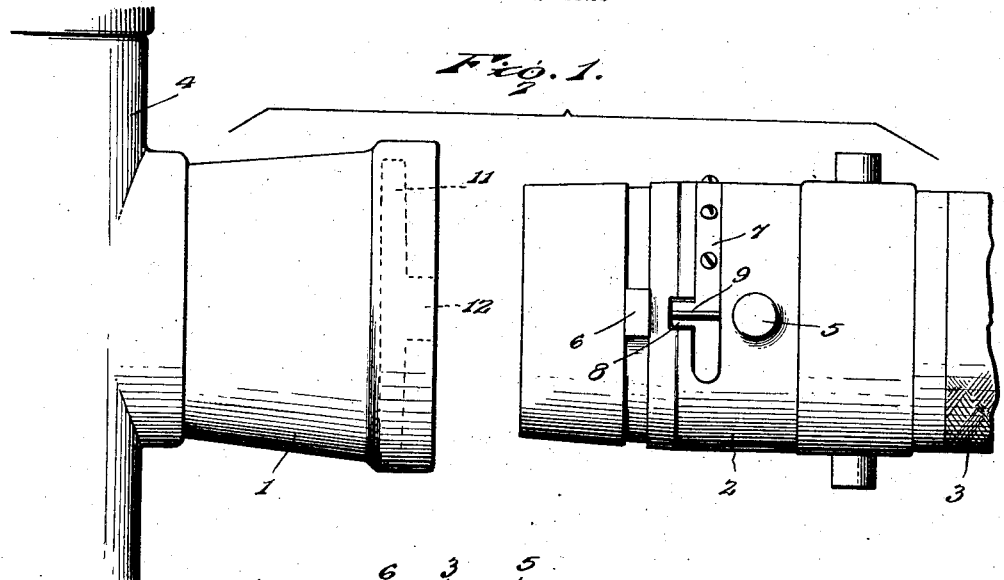
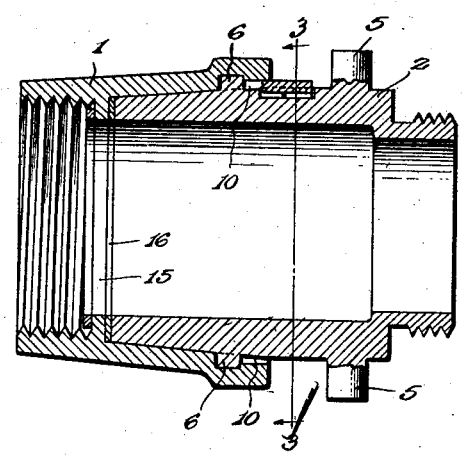
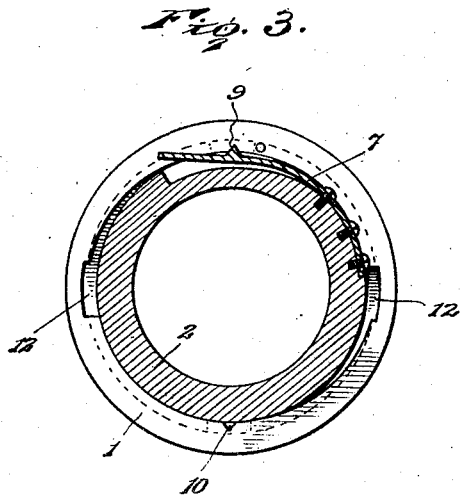
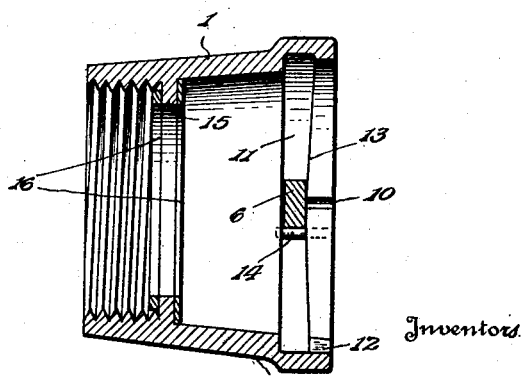
Inventors.
H. Anlauf.
T. J. Warhurst.
By
Lacey & Lacey, Attorneys Patented Mar. 22, 1927.

1,622,216

UNITED STATES PATENT OFFICE.

HERMAN ANLAUF AND THOMAS J. WARHURST, OF SAN ANTONIO, TEXAS.

COUPLING.

Application filed November 4, 1925. Serial No. 66,779.

The invention provides for a quick, positive and certain coupling of a fire hose to a fire hydrant, stand pipe or analogous part, as well as for hose sections when it is necessary to lengthen the hose to meet an emergency.

The invention provides a coupling which may be easily and quickly connected and separated and which when coupled is locked against displacement, the locking means being automatic in action to secure the parts and so situated as not to be accidentally unlocked and yet capable of being readily manipulated to release the parts to admit of their ready separation.

While the drawings illustrate a preferred embodiment of the invention it is to be understood that in adapting the means to meet specific needs and requirements the design may be varied, and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of a fire hose coupling embodying the invention and showing the members separated and attached to a fire hydrant and a fire hose, respectively, Figure 2 is a central, longitudinal, sectional view of the coupling as it appears when the members are connected, Figure 3 is a sectional view on the line 3—3 of Figure 2 looking in the direction of the arrows, and Figure 4 is a central, longitudinal, sectional view of the female member showing the lug of the male member in section.

Corresponding and like parts are referred to in the following description and designated in the several views of the drawings by like reference characters.

The coupling comprises a female member 1 and a male member 2 and one of these members is adapted to be fitted to a fire hydrant, a stand pipe or a length of fire hose or analogous part, whereas the companion member is adapted to be fitted to a fire hose, as indicated at 3, thereby admitting of two lengths of fire hose being easily and quickly coupled, or a fire hose being readily connected to a fire hydrant, a stand pipe, or other part. The numeral 4 designates a fire hydrant to which the member 1 is connected in any preferred manner. The members 1 and 2 are similar, in that each is hollow, and each has an end portion screw threaded for connection to the part to be coupled. The male member 2 tapers slightly in its length and the opening in the female member 1 is of corresponding taper and the two members have an interfitting ground joint to prevent leaks. The male member 2 is provided adjacent an end with outstanding lugs 5 for engagement therewith of a spanner or like tool whereby said member may be turned when connecting or disconnecting the members. The member 2 is also provided with elongated lugs 6 which are preferably disposed at diametrically opposite points and spaced some distance from the lugs 5 and these lugs 6 constitute locking means between the members when they are brought together. A spring 7 is let into a recess formed in the outer side of the member 2 and is secured at one end to the member, the opposite end being free and disposed to project beyond the outer side of the member 2 and having a lateral extension 8 provided upon its outer side with a V-shaped rib 9 to engage a corresponding groove 10 formed in the inner wall of the member 1 so as to form locking means between the two members and prevent accidental turning thereof. The spring 7 is arranged circumferentially of the member 2 and the lateral extension 8 projects beyond the outer side of the member 2 so as to insure engagement of the rib 9 with the groove 10, it being understood that the member 1 is formed with grooves 10 at diametrically opposite points.

The female member 1 is formed upon its inner side adjacent the receiving end with an annular groove 11 from which at diametrically opposite points extend openings 12 which provide passages for the ingress and egress of the lugs 6 when coupling or uncoupling the members. The inner wall of the annular groove 11 is uniformly spaced from the outer end of the member 1, whereas the outer wall is inclined as indicated most clearly at 13 in Figure 4 for the lugs 6 to ride upon and draw the members 1 and 2 together when rotating the member 2 to effect coupling of the parts. The outer wall 13 of the annular groove 11 inclines inwardly from the opening 12 and the effective length of this inclined wall is approximately one-fourth the circumference of the member 1 and the groove 10 is located substantially at the inner end of said wall and a stop 14 is provided and preferably consists of a pin extending across the groove 11 and this stop engages a lug 6 to limit the turning of the member 2 when connecting the parts of the coupling, and the groove 10 is disposed so as to receive the projection 9 of the locking spring 7 when the lug 6 engages the stop 14. An inner annular shoulder 15 is adapted to support gaskets 16 whereby provision is had to insure a close joint when the parts to be connected are coupled.

One member of the coupling is adapted to be fitted to one of the parts to be connected and the other member is fitted to the other part, substantially as indicated in Figure 1 and the hose pipe to be connected is coupled to the required part by introducing the member 2 into the member 1, the lugs 6 passing through the openings 12 and engaging the inner wall of the annular groove 11, after which the member 2 is turned to cause the lugs 6 to rise upon opposite inclined portions 13 of the outer wall of the groove 11 thereby drawing the member 2 within the member 1 and locking the same, and when the projecting rib 9 comes opposite one of the grooves 10 according to the direction of rotation of the member 2, it springs into said groove, thereby locking the member 2 against accidental displacement as will be readily understood.

Having thus described the invention, we claim:

A coupling of the character specified, comprising a member having a tapering opening and an inner annular groove with its outer wall oppositely inclined, and having openings upon its inner side only leading from the annular groove through the end of the member, and a companion tapering member provided with lugs to pass through the openings and enter the annular groove of the first mentioned member and ride upon the inclined outer wall thereof, and a spring mounted circumferentially upon the tapering member in position to clear the end of the first mentioned member, and having a lateral extension to enter the tapering opening and provided with an outer rib to engage a groove in the inner wall of the first mentioned member to secure the members when coupled.

In testimony whereof we affix our signatures.

HERMAN ANLAUF. [L. S.]
THOMAS J. WARHURST. [L. S.]